United States Patent [19]

Gross

[11] Patent Number: 4,877,474
[45] Date of Patent: Oct. 31, 1989

[54] PROCESS FOR THE PRODUCTION OF A HOLLOW CHAMBER PLATE OF SYNTHETIC MATERIAL

[75] Inventor: Heinz Gross, Muehltal, Fed. Rep. of Germany

[73] Assignee: Rohm GmbH Chemische Fabrik, Darmstadt, Fed. Rep. of Germany

[21] Appl. No.: 172,934

[22] Filed: Mar. 25, 1988

Related U.S. Application Data

[63] Continuation of Ser. No. 884,799, Jul. 11, 1986, abandoned.

[30] Foreign Application Priority Data

Jul. 26, 1985 [DE] Fed. Rep. of Germany ....... 3526752

[51] Int. Cl.⁴ ................................................ B32B 3/12
[52] U.S. Cl. ................................ 156/244.13; 156/197;
156/244.14; 156/244.22; 156/282; 156/324
[58] Field of Search .................... 156/197, 548, 244.22,
156/244.11, 244.13–244.14, 292, 210, 324, 282,
555, 497, 499; 428/116, 188

[56] References Cited

U.S. PATENT DOCUMENTS

| | | | |
|---|---|---|---|
| 2,992,673 | 7/1961 | Bishop | 156/197 X |
| 3,247,039 | 4/1966 | Schultheiss | 428/116 X |
| 3,673,032 | 6/1972 | Komoly | 156/210 |
| 3,673,057 | 6/1972 | Fairbanks | 428/116 |
| 3,682,736 | 8/1972 | Akamatsu | 156/210 |
| 3,816,204 | 6/1974 | Nagayoshi et al. | 156/210 |

FOREIGN PATENT DOCUMENTS

| | | |
|---|---|---|
| 1195476 | 6/1965 | Fed. Rep. of Germany . |
| 1504800 | 3/1969 | Fed. Rep. of Germany . |
| 1609777 | 8/1970 | Fed. Rep. of Germany . |
| 2050969 | 11/1971 | Fed. Rep. of Germany . |
| 2230901 | 2/1973 | Fed. Rep. of Germany . |
| 2556016 | of 1977 | Fed. Rep. of Germany . |
| 2536462 | 6/1977 | Fed. Rep. of Germany . |
| 3238370 | 4/1984 | Fed. Rep. of Germany . |
| 3238370 | 4/1984 | Fed. Rep. of Germany . |
| 457829 | of 1968 | Switzerland . |
| 1325017 | 8/1973 | United Kingdom . |

*Primary Examiner*—David Simmons
*Attorney, Agent, or Firm*—Oblon, Spivak, McClelland, Maier & Neustadt

[57] ABSTRACT

Hollow chamber plates of synthetic material are produced from two thermoplastic cover layers, which preferably have been produced immediately beforehand by extrusion, which are brought into contact with a large number of previously produced webs and welded together. By setting the webs into wavy lines running against each other, a high degree of rigidity in the hollow chamber plate is attained. A device for the production of such hollow chamber plates is described.

4 Claims, 4 Drawing Sheets

4,877,474

PROCESS FOR THE PRODUCTION OF A HOLLOW CHAMBER PLATE OF SYNTHETIC MATERIAL

This application is a continuation of application Ser. No. 06/884,799, filed on July 11, 1986, now abandoned.

BACKGROUND OF THE INVENTION

1. Field of the Invention

The invention concerns a process for the production of a hollow chamber plate of synthetic material by combining two flat layers of synthetic material, with a large number of webs arranged vertically between the flat layers.

2. Discussion of the Background

Hollow chamber plates which are made of synthetic material are primarily produced by extrusion, see DE-OS No. 15 04 800 and 16 09 777. It is known from CH-PS No. 457 829 and DE-OS No. 32 38 370 to extrude hollow chamber plates with webs that have waves parallel to each other by means of oscillating core pieces in the extrusion nozzle. It is also possible, according to DE-OS No. 25 36 462 to produce hollow chamber plates in one piece with webs having opposing waves by the subsequent expansion of a hollow chamber plate, extruded with varying thicknesses of the outside wall. According to DE-OS No. 20 50 969 hollow chamber plates with webs running at a slant to the extrusion direction can be produced by the simultaneous extrusion of a smooth synthetic material layer and a second synthetic material layer with webs that stand vertically on it and run at a slant to the extrusion direction. The two layers are subsequently combined in the thermoplastic state. In this process the webs run parallel to each other. According to DE-PS No. 20 27 836 a smooth synthetic material layer is joined to a second layer which has vertically arranged webs, preferably set in a grid, after the melting of the web heads.

The process according to DE-PS No. 25 56 016 permits the production of hollow chamber plates with arbitrarily arranged webs by gluing together separately produced cover layers and webs.

SUMMARY OF THE INVENTION

The object of the present invention is to produce a hollow chamber plate of synthetic material by combining two flat layers with a large number of continuous webs, arranged vertically between them, by means of a simplified procedure.

A further object is to provide a procedure which permits an arbitrary arrangement of the continuous webs and permits execution without the need for additional auxiliary materials for joining the webs to the layers.

These objects and other objects of the invention which will become apparent from the following specification have been achieved by the process and apparatus of the present invention.

The process works without glue or other auxiliary means for joining the webs to the cover layers. In a preferred embodiment the thermoplastic layers are produced by extrusion immediately before joining with the webs, so that no additional heating devices are needed for attaining the thermoplastic state.

The process according to the invention permits any desired arrangement of the webs, for example, a plate can be produced with changing distances between the webs in a lengthwise direction until the webs touch.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
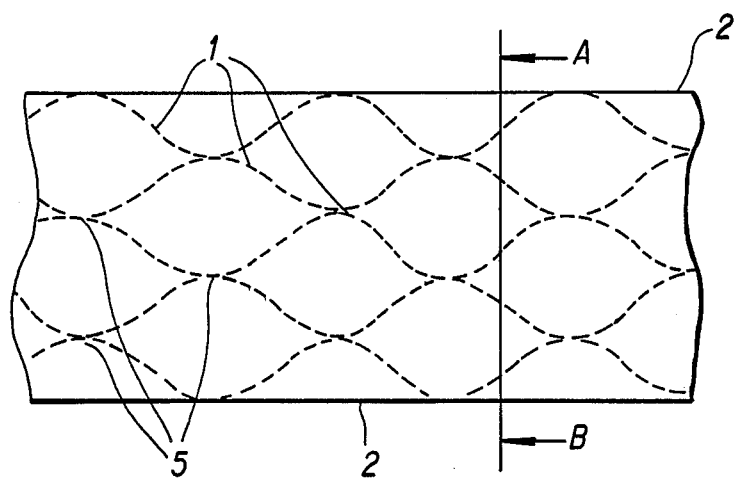
FIG. 1 shows a top view of a hollow chamber plate produced according to the process of the invention, in which the edge webs are in a straight line and the inside webs are arranged in an alternating fashion in wavy lines running in opposite directions.
Figure 2:
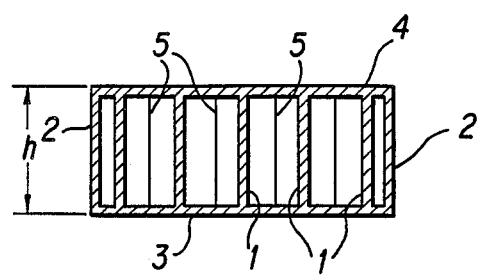
FIG. 2 shows the view on the cut along line AB in the hollow chamber plate shown in FIG. 1.

The process of the invention can be used for the production of hollow chamber plates with straight line, parallel or wavy parallel webs. Contrary to the known procedures, in which the webs are produced by a single piece extrusion with the cover layers, the webs and cover layers of the invention can be produced from different synthetic materials, as long as they can be welded together under the procedural conditions. This applies, for example, to differently colored webs and cover layers, or those containing different additives, of otherwise the same synthetic material.

It is also possible to process webs with a fine structure, e.g., fine waving or pleating, which cannot be produced by extrusion.

It is also possible with the present invention, to arrange the webs at various distances. By alternating the orientations of the webs arranged between the edge webs and their neighboring webs, a considerable crosswise rigidity of the hollow chamber plate can be attained.

Prefabricated webs and cover layers are used for the procedure and it is advantageous to produce the cover layers by extrusion immediately before joining and to join them with the webs while still in the thermoplastic state. The webs can also be produced by extrusion. However this is preferably done independently of the process of the invention. It is, for example, possible to use prefabricated strip material taken from a roll for each web.

The cover layers and webs consist of thermoplastic synthetic materials, preferably with a melting temperature between 100° C. and 450° C. Suitable materials are, for example, acrylic glass, i.e. homo and mixed polymerisates of methylmethacrylate, polystyrol, polyolefin, polyvinylchloride, polycarbonate, polysulfone, polyester, polyamide, polyphenylenoxide or similar materials. The cover layers and webs usually have the same or similar thicknesses, which are in the range of from about 0.5 to 2 mm. The webs can be from about 5 to 50 mm high and have distances between them in the same range. The cover layers usually have a width of between 0.5 m and 2 m.

Other features of the invention become apparent in the course of the following description of an exemplary embodiment which is given for illustration of the invention and is not intended to be limiting thereof.

The invention is further explained below by reference to a preferred embodiment, in which hollow chamber plates are produced with webs 1 in alternating wavy lines. The edge webs 2 preferably run in a straight line. All webs have the same height and join flat cover layers 3 and 4. Adjoining webs touch at culmination points 5. The designs are correspondingly applicable for other embodiments.

It has proven suitable to first put the webs to be connected with a cover layer into the desired position and to temporarily fasten them down by means of suitable fasteners. Then, a thermoplastic cover layer is set onto the upper web edges and they are welded together. After cooling, the webs are fixed to the cover layer, so that the temporary fastener can be removed and in a further work stage the lower web edges joined to the second cover layer in a similar manner.

Figure 6:
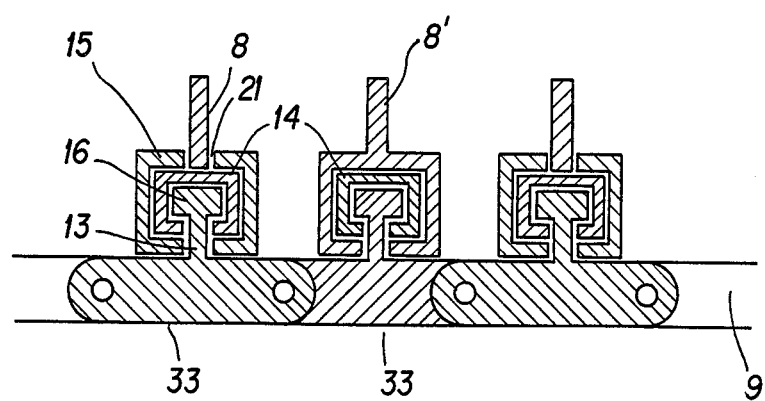
FIG. 6 shows a section of the device shown in FIG. 5 along the cut CD in FIG. 5.
Figure 3:
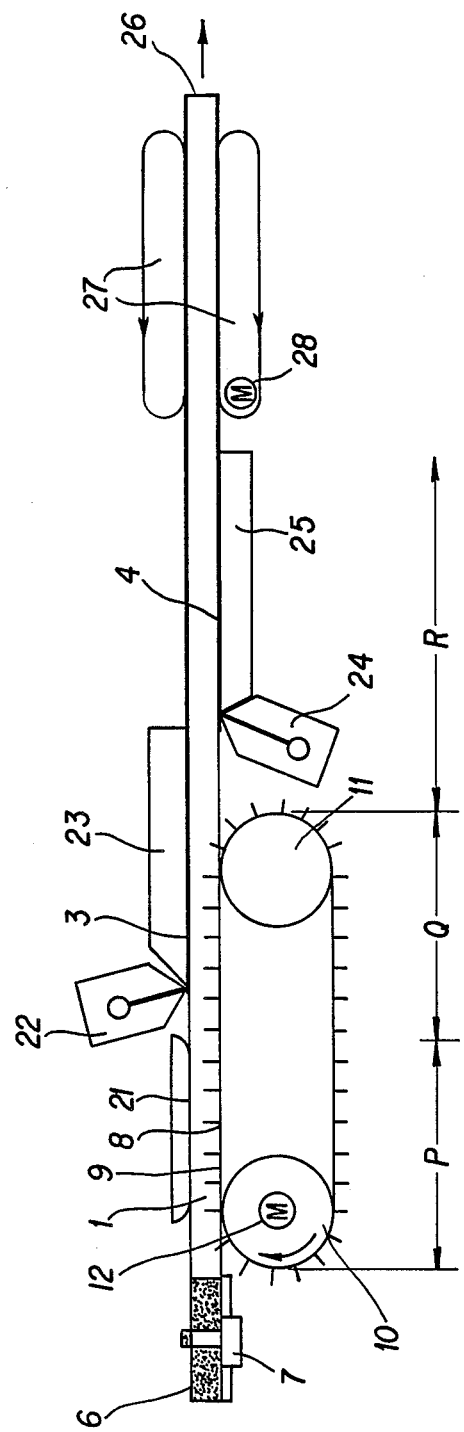
FIG. 3 shows a schematic cross section through a device for the continuous execution of the process according to the invention.
Figure 5:
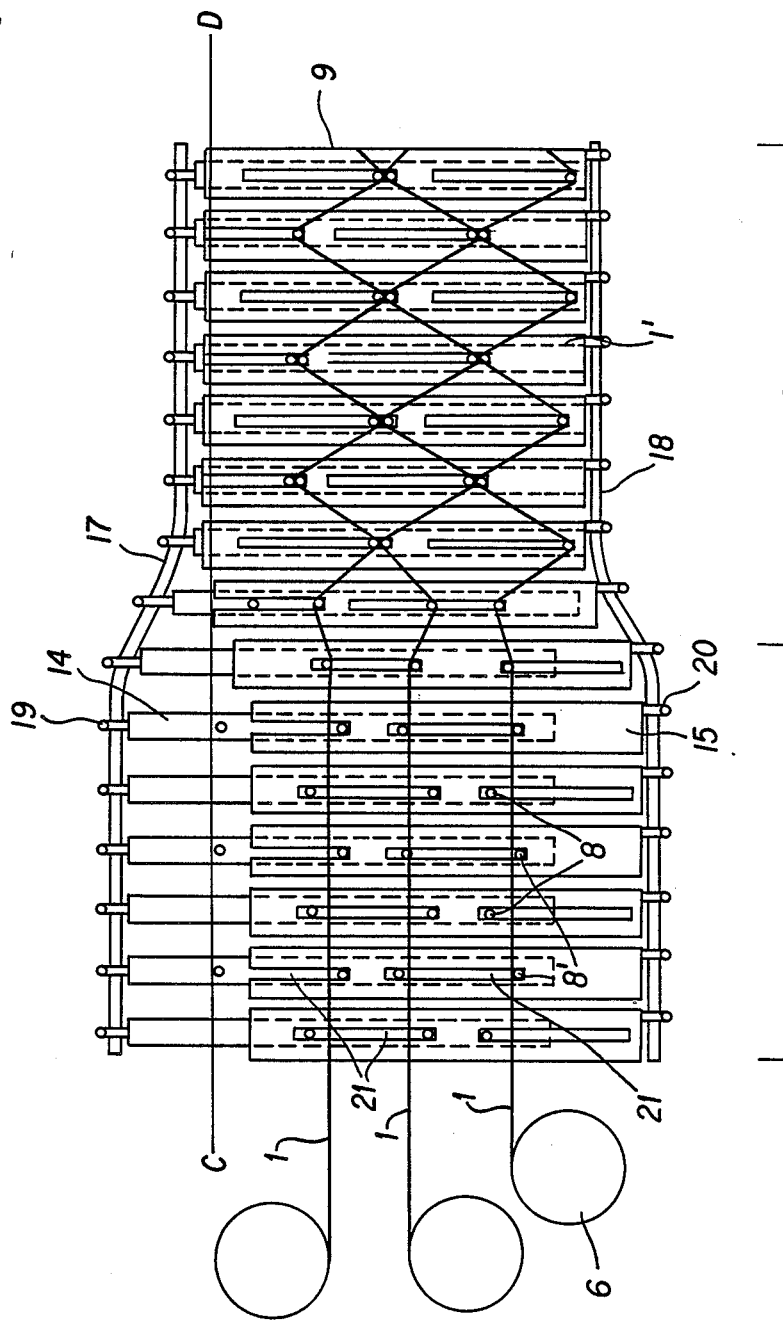
FIG. 5 shows a top view of a part of the devices shown schematically in FIGS. 3 and 4.

In the device shown in FIG. 3 the transport chain 9, equipped with sorting pins 8 serves as a temporary fastener for the webs 1, rolling off continuously from the storage roll 6. On a roll holder 7 a number of storage rolls 6, corresponding to the number of desired webs, are arranged for rotation. The operation and working process of the transport chain 9 can be seen from FIGS. 5 and 6. The chain 9, consisting of chain links 33, runs slowly across cogwheel guides 10 and 11 in the extrusion direction, whereby the speed of the drive 12 is set in such a manner that the chain runs at the extrusion speed. The chain links 33 carry protrusions 13 to which slides 14 and 15 are attached and are shiftable crosswise to the direction of motion. The protrusions 13 suitably have extended heads 16, which are encased by the slide 14 which has a tapered U-shape. The slide 15 with a similar but larger profile, surrounds slide 14. The lateral motion of slides 14 and 15 is controlled by guide rails 17 and 18. At the end of slide 14, a claw 19 is arranged which reaches across the guide rail 17 so that the slide 14 always follows the contour of the guide rail 17. Slide 15 with claw 20 is led in the same manner along guide rail 18. The slides 14 carry sorting pins 8 which reach outward through slits 21 in the slides 15. Slides 15 also carry sorting pins 8' The sorting pins 8 and 8' are arranged on the slides 14 and 15 in such a manner that with a spread out position of the slides they are in the motion range P of the chain 9. The sorting pins are located on both sides of the webs 1 that run in a straight line. When the slides 14 and 15 run together in the motion range Q of the chain 9, the sorting pins 8 and 8' move against each other along the inflow line 1' (drawn in a dotted line) of the webs 1, which causes the web to travel a wavy line. The restrainer 21 prevents the lifting of the webs from the needle hold by the sorting pins 8 and 8'.

In the area Q, the upper cover layer 3 is set onto the webs 1, which have been arranged in a wavy pattern, by means of the sheet extrusion tool 22 and cooled to below the softening temperature on the calibrator 23, which suctions the cover layer 3 by means of a vacuum.

After loosening the webs from the chin 9, the second cover layer 4 is applied in the subsequent area R by means of a second sheet extrusion tool 24 and cooled on the calibrator 25. The finished hollow chamber strip 26 is pulled off regularly, depending on the extrusion speed by means of the removal device 27, consisting of a pair of cylinders or a double belt, with a drive device 28.

Figure 4:
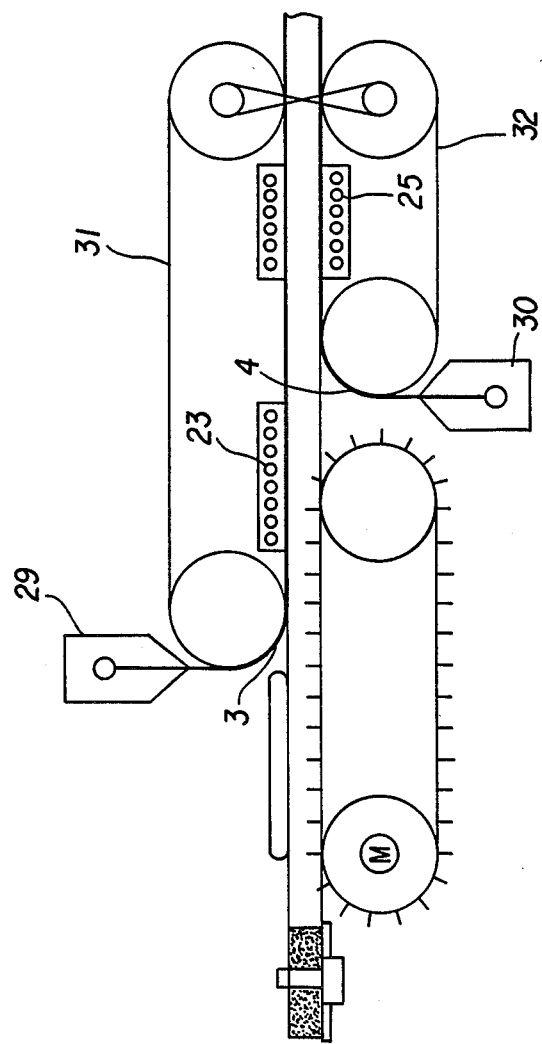
FIG. 4 shows another embodiment for such a device.

In the device according to FIG. 4, the cover layers 3 and 4 are not directly applied from the sheet extrusion tools 29 and 30 to the web edges, but to continuously running belts 31 and 32 (preferably made of polished steel), heated to the melting temperature from which they are transferred to the web edges. The calibrators 23 and 25 affect the extruded cover layers 3 and 4 indirectly via the continuous belts 31 and 32. The continuous belts simultaneously function as the removal device. This variation of the process produces hollow chamber plates with a particularly high surface quality.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for the production of a hollow chamber plate of synthetic material, comprising the steps of:
   (i) continuously supplying a plurality of prefabricated webs at a temperature below their softening point,
   (ii) extruding a first cover layer in a thermoplastic condition onto a continuous belt heated to the melting temperature of said first cover layer and contact said webs and said first extruded cover layer, wherein when contacted, said first extruded cover layer is in a thermoplastic condition and said webs are at a temperature below their softening point,
   (iii) cooling said contacted first extruded cover layer to below its softening temperature by cooling said continuous belt and indirectly said first cover layer,
   (iv) extruding a second cover layer in a thermoplastic condition onto a continuous belt heated to the melting temperature of said second cover layer and contacting said web and said second extruded cover layer, wherein when contacted, said second extruded cover layer is in a thermoplastic condition and said webs are at a temperature below their softening point, and
   (v) cooling said contacted second extruded cover layer to below its softening temperature by cooling said continuous belt and indirectly said second cover layer.

2. The process of claim 1, wherein said extruding steps comprise producing said first and second cover layers in a termoplastic condition by extrusion immediately before said contacting.

3. The process of claim 1, wherein said continuously supplying step comprises arranging one or more of said prefabricated webs at various distances from adjacent webs within said plurality of prefabricated webs.

4. The process of claim 3, wherein said webs are arranged such that said webs alternatingly touch adjacent webs or are set at a small distance from said adjacent webs.

* * * * *